United States Patent [19] — Kawanabe
[11] 4,353,079
[45] Oct. 5, 1982

[54] ELECTRONIC DEVICE HAVING A VARIABLE DENSITY THERMAL INK JET RECORDER

[75] Inventor: Tsuyoshi Kawanabe, Yokohama, Japan

[73] Assignee: Canon Kabushiki Kaisha, Tokyo, Japan

[21] Appl. No.: 133,302

[22] Filed: Mar. 24, 1980

[30] Foreign Application Priority Data

Apr. 2, 1979 [JP] Japan ................................ 54/39474

[51] Int. Cl.³ ........................................ G01D 15/18

[52] U.S. Cl. ........................................ 346/140 R

[58] Field of Search .............. 346/140 R, 140 PD, 75; 358/298, 299

[56] References Cited

U.S. PATENT DOCUMENTS 3,977,007 8/1976 Berry et al. ...................... 346/75 X
4,084,195 4/1978 Pereira .......................... 358/298 X
4,168,533 9/1979 Schwartz ......................... 346/75 X
4,189,734 2/1980 Kyser et al. ............ 346/140 PD X
4,243,994 1/1981 Kobayashi et al. ............ 346/140 R
4,251,824 2/1981 Hara et al. .................. 346/140 PD

*Primary Examiner*—Richard A. Wintercorn
*Assistant Examiner*—W. J. Brady
*Attorney, Agent, or Firm*—Fitzpatrick, Cella, Harper & Scinto

[57] ABSTRACT

An electronic device provided with recording unit in which thermal energy is made to act on a fine solution compartment, the liquid in orifice section is pushed out by the air bubbles generated, keyboard, arithmetic and logical unit, memory unit, control unit, and power supply, in which arithmetic operation or control is made based on the command from the keyboard to record numerics, characters, symbols, etc. on recording paper, and based on the command from said keyboard, said control circuit selects the number of times of liquid discharge.

4 Claims, 25 Drawing Figures

ELECTRONIC DEVICE HAVING A VARIABLE DENSITY THERMAL INK JET RECORDER

BACKGROUND OF THE INVENTION

This invention relates to an electronic device provided with recording unit in which liquid is made to generate air bubbles by the action of thermal energy and the liquid is made to discharge by the operating force based on the change in the phase of the air bubbles. Further, this invention offers an electronic device capable of representing dense and light print density such as half tone by controlling the number of times of discharge.

In the conventional so called thermal print system where thermal head is made to touch heat sensitive paper to develop color, the time required for the chemical changes for color development on the heat sensitive paper is comparatively long. Therefore in order to repeat electric transmission a plural number of times such as two times or three times, that much more time is required and as a result it was difficult to repeat a plural times while securing practically necessary printing speed. Moreover, high density was not always obtained by leaving the head pressed at the same position of the heat sensitive paper and transmitting electricity a plural number of times.

In the thermal ink jet system according to this invention, however, since the air bubbles are generated at high speed by heat generation, resultant practical printing speed is not damaged by repeating air bubbles generation many times and discharging the ink many times.

Moreover, since by discharging ink many times to the same position of the printing paper the amount of ink injected to the point of the printing paper is increased, the dot diameter caused by running ink is increased and becomes dense, the large contrast effect of the print is obtained.

Moreover, in the conventional ink jet system, for example, the system in which piezo electric element is used and ink is discharged by the mechanical distortion of ink leading tube, it was hard to obtain contrast of print by large number of times of discharge of ink for reason of limitation caused by response speed of the mechanical distortion and for the following reasons.

For constructional reason of establishing piezo electric elements around the lead-out tube, it was hard to arrange a large number of the lead-out tubes so close to one another as the proper character dot pitches. Accordingly, the method in which many dots are discharged by moving a small number of lead-out tubes mechanically in the vertical or horizontal direction of the character was employed in many cases. In this case, time is naturally required in the mechanical shifting and operation.

Therefore, it was necessary to end this movement and stopping in smallest possible time in order to obtain required printing speed. However, there is limit in machine speed. For this reason, it was difficult to perform a large number of times of ink discharge without sacrificing practical printing speed.

On the contrary, in the thermal ink jet system according to this invention, since its construction is so simple as to fill a large number of grooves provided on one surface of the base board with ink and to give thermal energy selectively corresponding to the grooves, recording can be made as close to each other as the same degree of the dot pitches of practical character similar to the thermal head for conventional heat sensitive paper.

Accordingly, by employing such a multi-head configuration as this, mechanical driving of the head becomes unnecessary and improvement of printing speed is attained without adding the time required in the mechanical driving.

Moreover, a large number of times of ink discharge can be made within the range of practical printing speed.

Furthermore, the number of liquid drops discharged at the same time can also be controlled easily.

Now the configuration and operation of each section of an embodiment will be described in detail referring to the drawing.

DESCRIPTION OF THE PREFERRED EMBODIMENT

Figure 1:
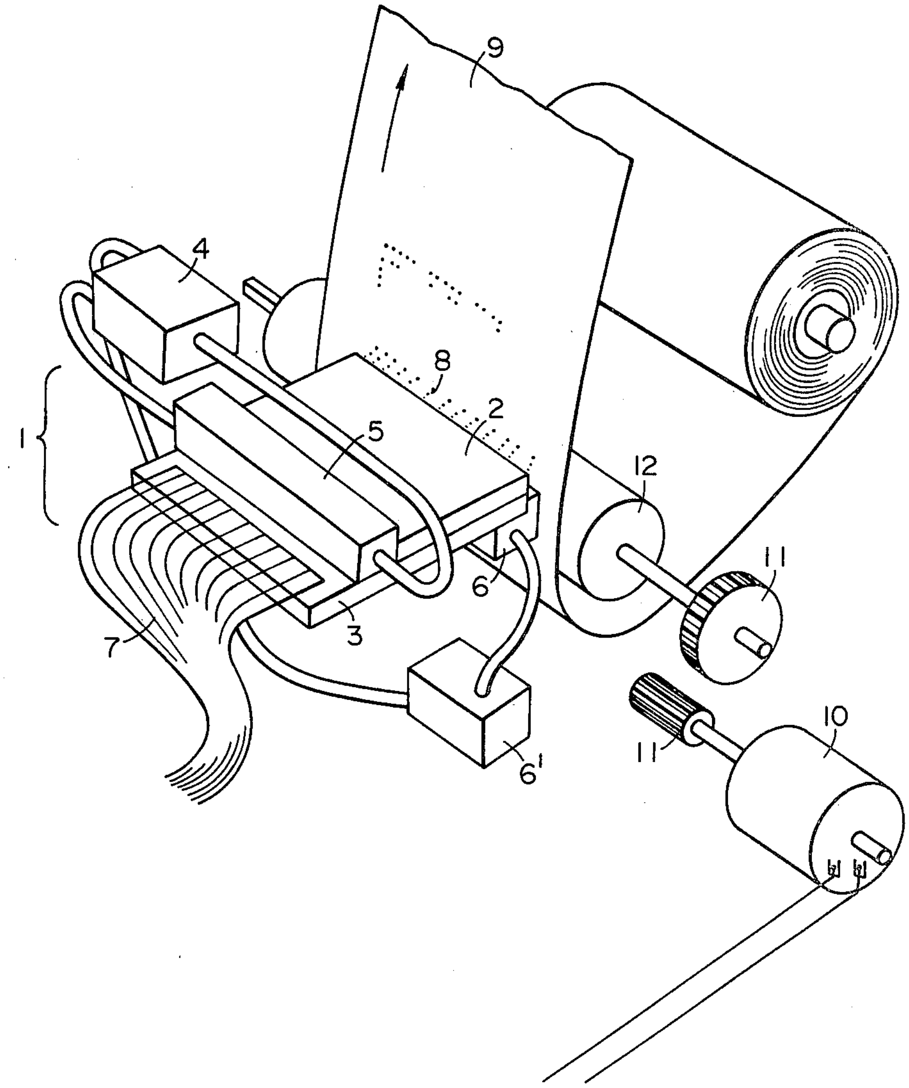
FIG. 1 shows the slant view of the invented recording unit.

In FIG. 1, the recorder unit 1 consists of a lid baseboard 2 having a duct which serves as the ink leadout pipe, a heater base board 3 provided with a heater, wiring and electrodes corresponding to said groove, an ink tank 4, ink supply case 5, ink receiver 6 and a pump 6′ which collect and return overflowed ink, a signal wire 7, other things such as ink pipe. However, the ink receiver 6, and the collecting pump 6′ can be omitted if ink is prevented from flowing out by adjusting pressure.

The liquid drop 8 of the ink discharged from the nozzle formed by said lid baseboard 2 with groove and said heater baseboard 3 represent dots letters and figures on the printing paper 9.

The printing paper 9 is fed upward by the rotation of paper feed roller 12 which is activated through the transmission mechanism 11 consisting of gears by the power of the motor 10.

If here, the full multihead configuration is used in which said grooves and heaters are arranged close to each other in required dot number and at predetermined dot pitches, this head unit 1 is not required to be shifted at all. In the above-mentioned configuration the heaters, which correspond to the required dots in a line in horizontal direction, are first electrically selected and, by the bubble formation in the grooves corresponding to these heaters, the ink is pushed out and liquid drops are discharged. Next, after the printing paper has been sent upward by 1 dot pitch by the power of said motor, necessary dots on one line in horizontal direction are printed in similar manner. By repeating these operations for required number of lines, the required letters and drawings are represented.

For example, in order to print characters of 20 places on one line by employing the 5 horizontal×7 vertical dots per character system frequently used in the representation of characters, it is sufficient to form a head unit having 5×20=100 grooves and to feed paper 7 times.

Figure 2:
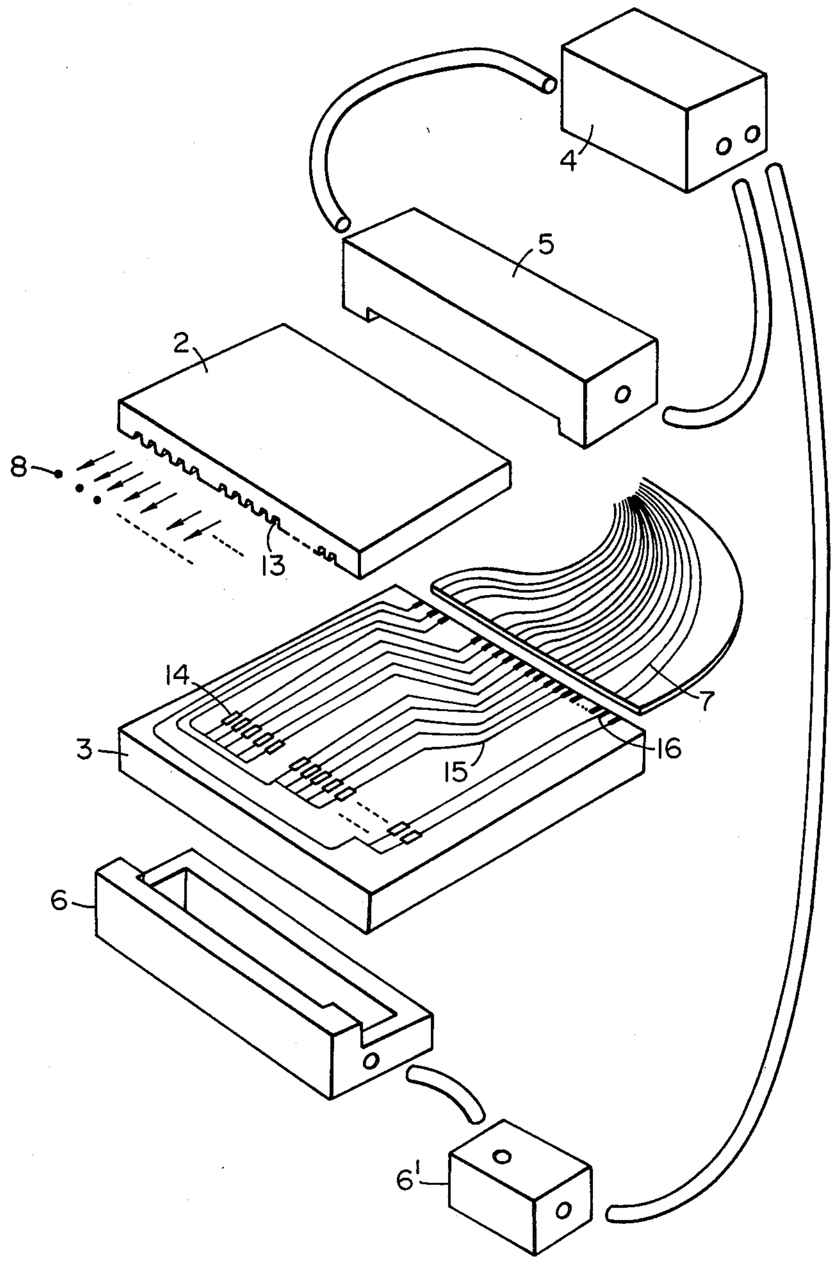
FIG. 2 shows the head section thereof and main configuration of the ink tank.

FIG. 2 is the exploded view of record head. On the lid baseboard with grooves, a plural number of grooves 13, which correspond to the required number of dots, are carved almost parallel to each other and on the heater baseboard 3 heaters 14 are formed on the midway section of the groove, facing these grooves and corresponding to each groove.

As the method for forming a plural number of heaters on the baseboard, similar to the ordinary method of forming multithermal head, universally known techniques or similar technique are used as semiconductor technique, thin film, thick film technique, and the surface of the baseboard is smoothened in order to obtain better contact with grooved lid baseboard 2. Each of the heaters 14 is wired by way of wiring pattern 15 on the baseboard and the electrode 16 to the signal line 7 consisting of that cable etc., and driven electrically.

Figure 3A:
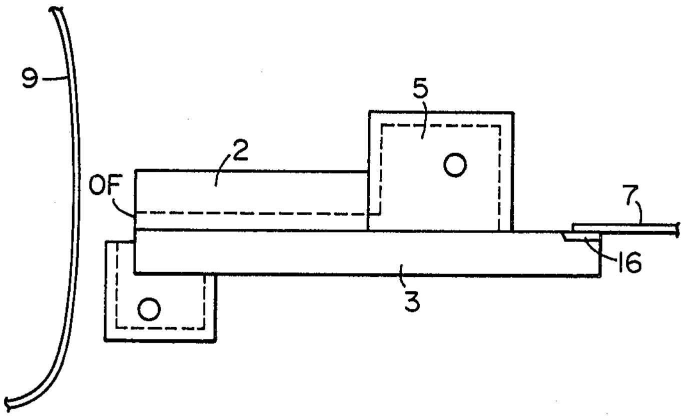
FIG. 3(A), (B), and (C) are partial enlarged drawing and cross sectional view thereof.
Figure 3B:
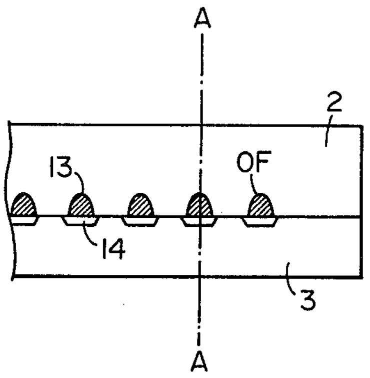
Figure 3C:
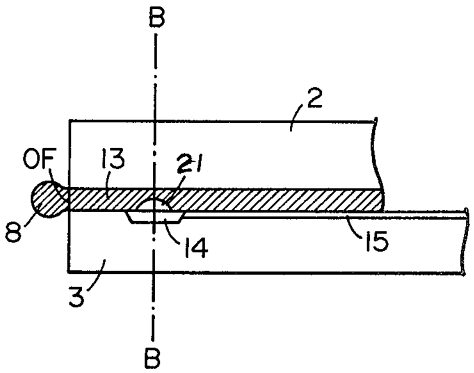

FIG. 3 is a magnified view of the head unit. FIG. 3(A) is the side view, FIG. 3(C) is the cross-sectional view from sideway (A—A cross section in FIG. 3(B)), FIG. 3(B) shows discharge port or the cross sectional view (B—B cross section in FIG. 3(C)) from orifice OF side.

In FIG. 3(C) when the heater 14 is powered and heated, the ink in the groove 13, which is in contact with the heater by way of the protecting layer, is heated and the air bubbles 21 are rapidly generated, and being pushed out by the pressure the ink is rapidly discharged in the form of liquid drops 8 from the discharge port. By conducting electrically and heating the heaters, which correspond to required dots selectively and either simultaneously or sequentially, the ink in the corresponding grooves is discharged rapidly from orifice OF and recorded on the printing paper 9. The air bubbles disappear there. If here the position of heater 14 is too close to the orifice OF side, the air bubbles 21 are also discharged together with the liquid drops and may break and disperse the liquid drops 8. If on the contrary the heater 14 is placed too far away from the orifice OF, the liquid drops 8 may not be discharged. This is the reason why the heater 14 is placed at midway position.

The configuration and operation of an electronic desk calculator will be explained in the following as an example of electronic devices in which the thermal ink jet recording unit shown in the above drawings is built in.

Figure 4:
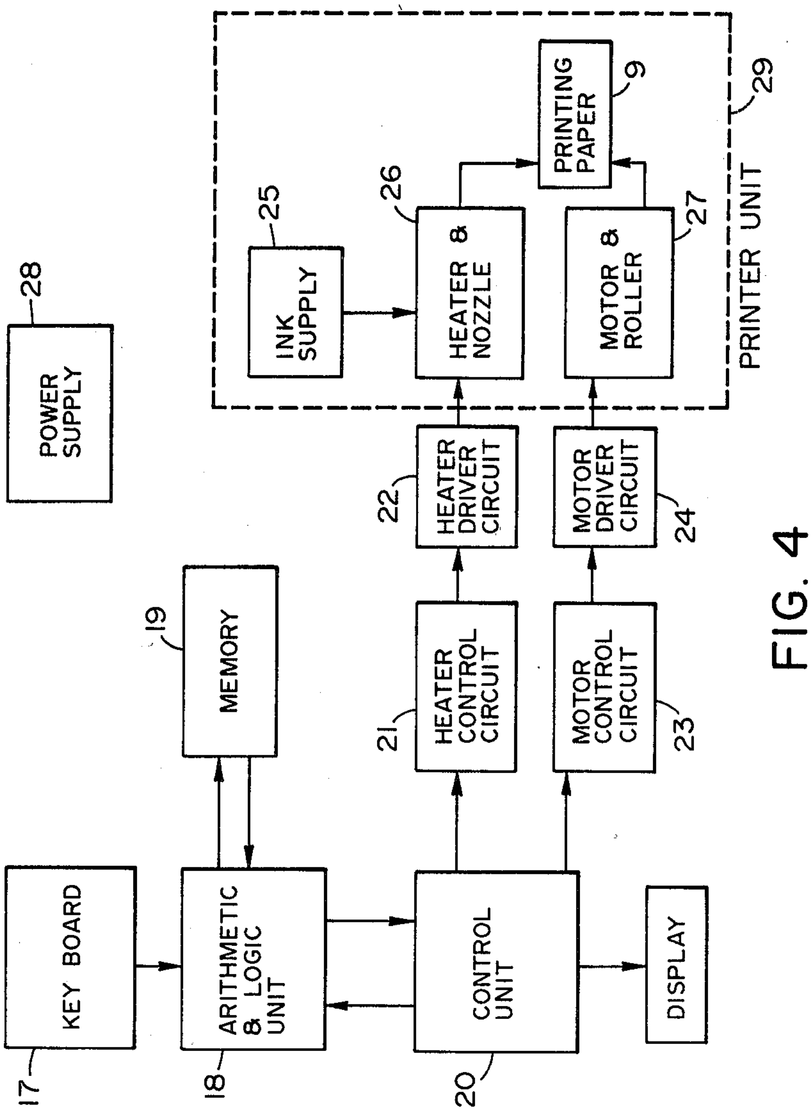
FIG. 4 is a block diagram showing the total configuration of electronic type desk calculator given as an example of electronic device.

In FIG. 4, the arithmetic and logic unit 18 performs together with the memory unit 19 necessary operations and processings such as addition, subtraction, multiplication, and division, memory storage and reading based on data input as number setting from keyboard and each operation command.

Here, the data required to be recorded such as the numbers to be operated and the results of arithmetic operations are sent to the control unit 20 based on the command of keyboard 17 and by way of the arithmetic and logical unit 18 and there compiled into data format required for recording.

Further, these data are encoded in heater control circuit into dot output necessary for each character by way of character generator and sent to each thermal head selectively by way of the heater driver circuit 22.

On the other hand, in order to perform paper feed for 1 dot every time the selective transmission of electricity in each dot line, the signal caused by the motor control circuit 23 is applied to the motor by way of the motor driving circuit 24, and the printing paper 9 is fed by the rotation of the roller.

The printer unit 29 consists together with the ink supply unit 25 composed of the ink tank 4, ink supply case 5, etc., of heater and nozzle unit 26, and motor and roller 27 and necessary dot printing is made by the repetition of the ink discharge caused by selective transmission of electricity of the heater and the repetition of paper feed by the motor.

Necessary power is supplied to each section from the power supply 28.

Moreover, the method in which electricity is transmitted to each head in time-sharing system with wirings of matrix formation made by connecting heaters of the dots corresponding to each position in common, is employed in the heater driving circuit 22.

Figure 6:
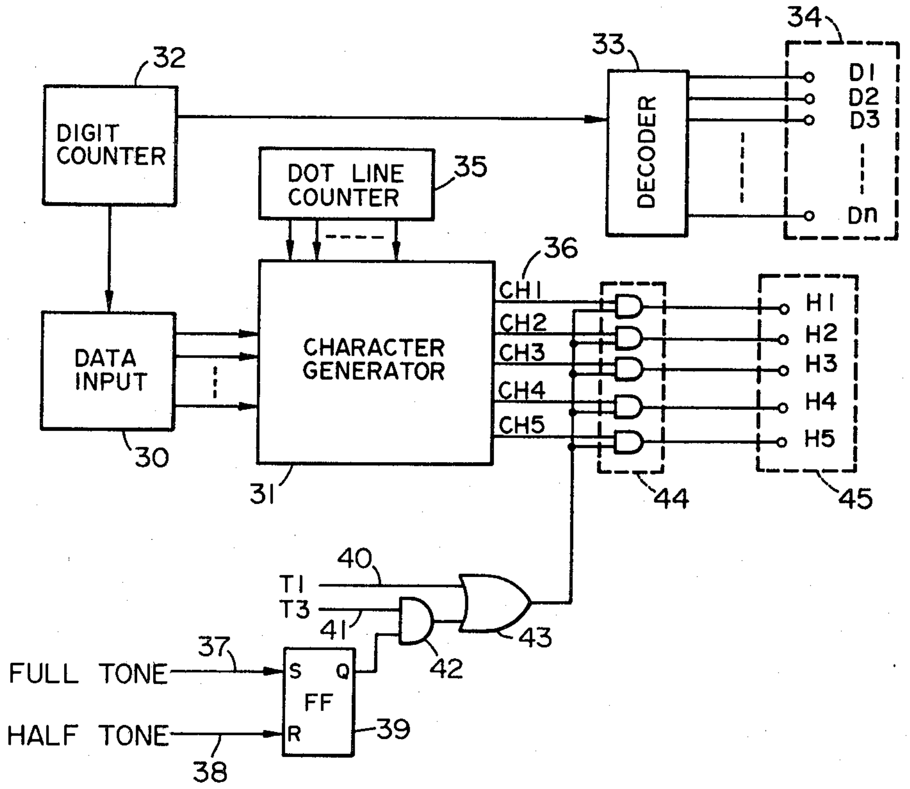
FIG. 6 is a logical block diagram explaining mainly the control of recording unit among each block of FIG. 4.

The main sections of the heater control circuit 22 are shown in FIG. 6 where the sections control the multiple times of ink discharge.

Figures 7A, 7B, 7C, 7D:
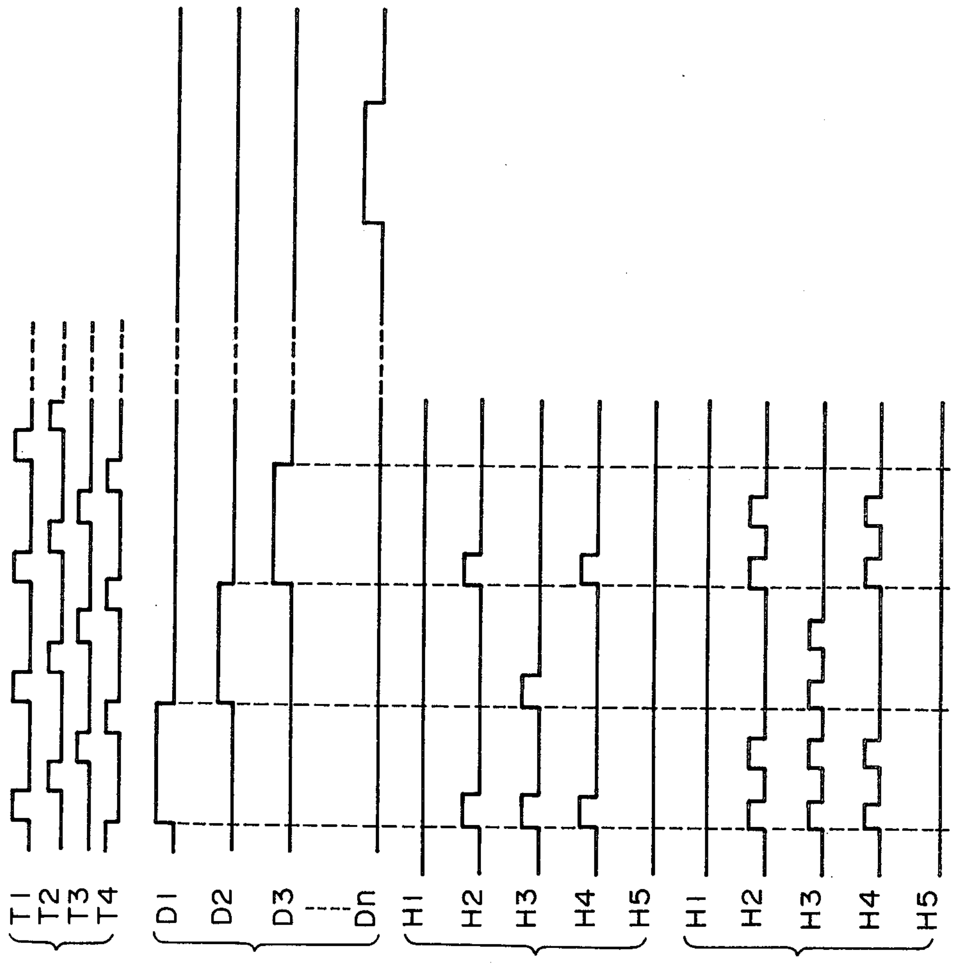
FIGS. 7(A), (B), (C), and (D) are timing charts showing the waveform of each signal in the control circuit shown in FIGS. 4–6.

As described above, the input data 30 coming from the arithmetic and logic unit 18 and control unit 20 are input to the character generator 31. The digit counter 32 which counts the number of digits designates one digit of input data and at the same time the contents of the counter are decoded by the decoder 33 to form each digit signal $D_1$-$D_n$ as shown in FIG. 7(B). These digit signals, $D_1$-$D_n$ are applied to each digit of the heater by way of the driver circuit 22.

To the character generator 31 is output the code output 36 of the dots whose line is designated by the dot line counter 35 and which correspond to the input data 30 whose digit has been designated as described above. In the case of 5×7 dots per character as described above, the dot line counter is on radix 7 and the code output 36 becomes 5 lines.

The cases of the 1 time discharge per digit and of 2 time discharge per digit are selected by the flip-flop 39. It is assumed here that in FIG. 7, the basic timing signals $T_1$-$T_4$ are repeated as shown in FIG. 7(A) and each digit signal $D_1, D_2 \ldots D_n$ of FIG. 7(B) synchronized to the trailing edge of $T_4$.

Whether the printing is made in half tone or dense in full tone is commanded by the keyboard. Based on this command, the set or reset input signal of flip-flop 39 is applied selectively by way of the control unit 20. For example the method in which exclusive keys used to select whether deep printing or light printing will be made are provided or the method in which deep and light commands are sent by deciding the kinds of keys in the control circuit 20 such as making light printing for the numbers operated by [×] [÷] keys and making deep printing of the results of arithmetic operation given by [=] key is used.

In other words, when the flip-flop 39 is set by the set input 37 of the flip-flop 39, its output, together with the timing $T_3$, is ORed with the timing $T_1$ by the OR gate 43 via the AND gate 42.

In other words, both $T_1$ and $T_2$ are applied to each AND gate 44 together with each of character code outputs 36.

Accordingly, $H_1$–$H_5$ of each head driving signal 45 are output 2 times at time of each digit of each signal $H_1$–$H_5$. Ink is discharged two times by the 2-time driving of the head and a large ink spread is made on the printing paper as shown in FIG. 8(B).

On the contrary, in the case where the reset input 38 is applied to the reset input terminal of the flip-flop 39 as shown in FIG. 6, the AND gate 42 will not open and the output of the OR gate 43 is only $T_1$, and the output 45 of each signal $H_1$–$H_5$ is made one time for each digit as shown in FIG. 7(C).

Figure 8A:
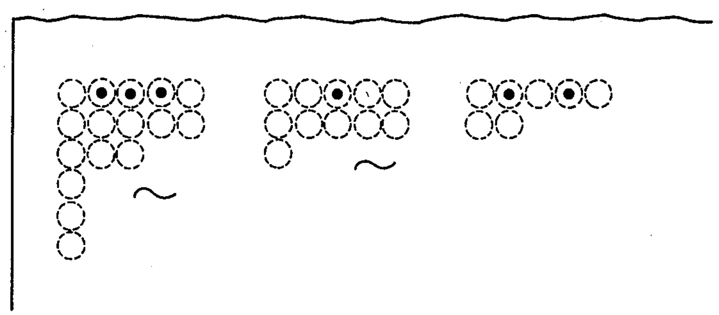
FIGS. 8(A), (B) and (C) are drawings which compare and explain that the discharged ink represents density as large and small dots on the printing paper.
Figure 8B:
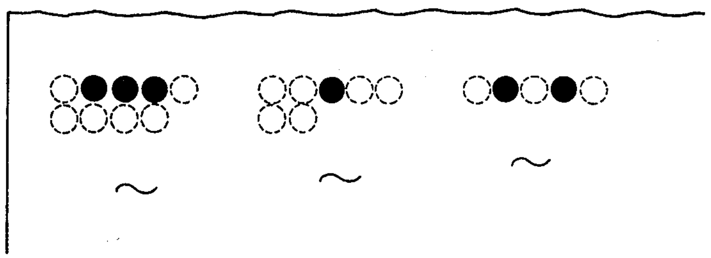

Accordingly, compared with the case when driving is made two times, the amount of the ink is halved and makes a small dot on the printing paper as shown in FIG. 8(A), which appear to human eye as a light half tone. As has been described so far the number of times of ink discharge can be selected and accordingly the amount of ink on the printing paper, dot diameter, or dot density can be controlled by a simple configuration attained by adding one flip-flop and small number of gates beside a set of character generator and counter.

This enables electronic type desk calculator to represent distinctions between the number of grooves and results of arithmetic operation and between the numbers used in arithmetic operations and the date print as easily understandable print density.

Figure 8C:
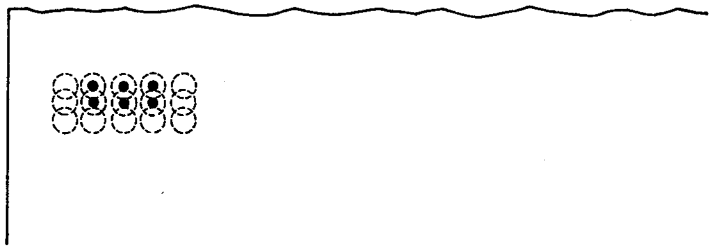

FIG. 8(C) shows an example where feed pitch of the printing paper is reduced in order to reduce the vertical dot intervals at time of half tone.

Although in this embodiment selection of one time discharge and two time discharge were taken as an example, it is evident that by making a small addition to the logical circuit more dense print can be obtained with three or more times the discharge.

Moreover, the method of selecting the number of dots in the unit area on the printing paper by deflecting the flight direction of liquid drops by means of static deflection or magnetic deflection in order to represent density tone on the printing paper is also known.

However, since this method requires a large scale device for deflection, it is inpracticable in the electronic type desk calculator where only characters are printed.

Furthermore, as the methods for obtaining dense or light print, such methods as selecting the nozzle diameter for the purpose of selecting the size of the diameter of ink drops or as selecting the voltage to be applied to the head can be considered.

However, these methods need a complicated technique in the determination of nozzle structure and in the selector circuit of applied voltage.

Contrary to this since in this invention the ink is only discharged to the same point for a plural number of times, the nozzle structure and driving mechanism need no additional parts and since only a portion of logic circuit is attached to the control circuit, the practical effect is great.

Especially, in an electronic type desk calculator where all arithmetic, logical, and control circuit are LSIed (large scale integrated circuitized), addition of logical circuit in the LSI is advantageous expensewise as compared to the addition of mechanical structure.

An embodiment in which control is made to discharge liquid drops from a single nozzle by a single dot information source has been described. An embodiment in which the discharge from a plural number of nozzles is controlled and driven will be described hereafter.

Figure 5:
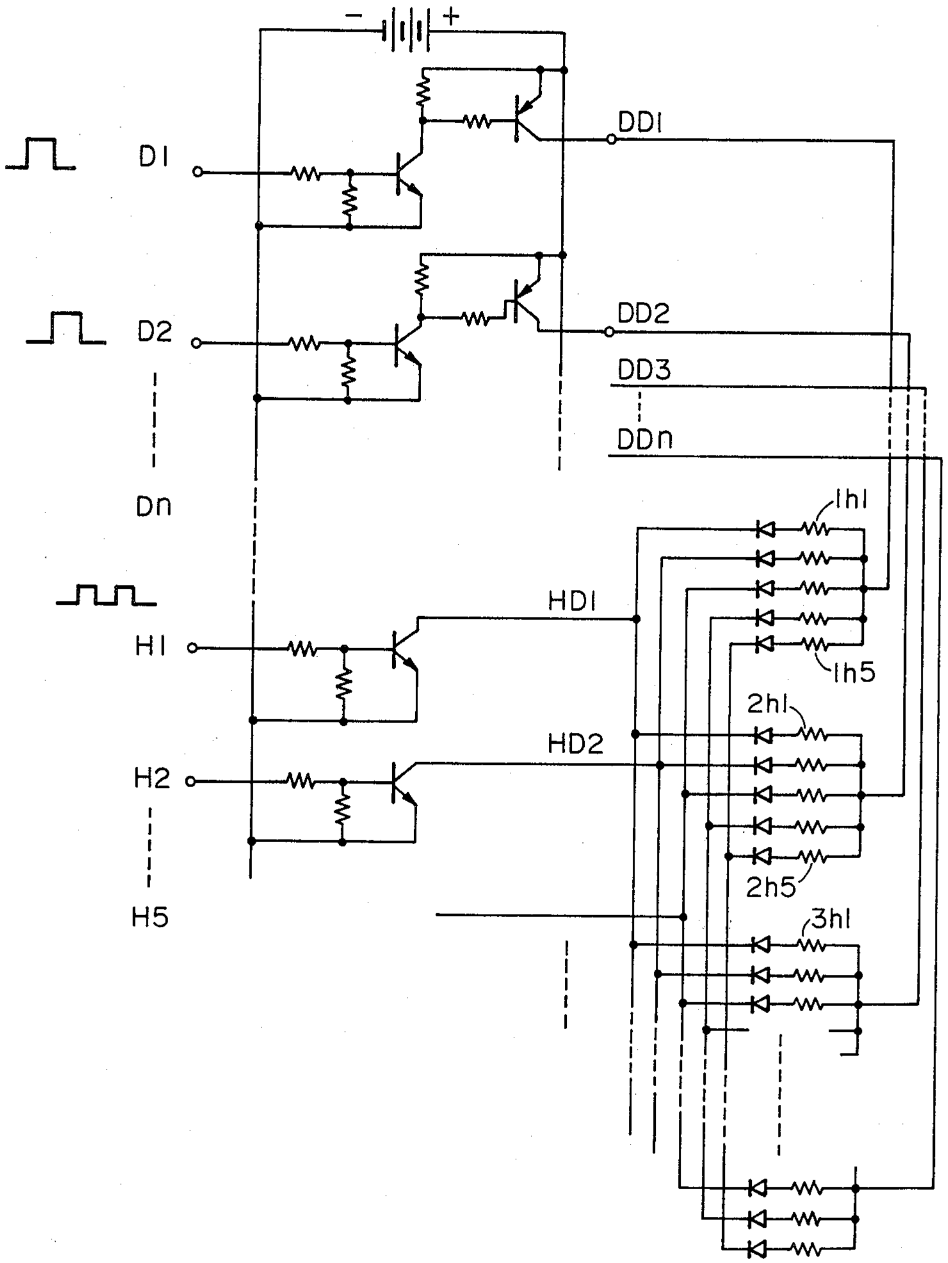
FIG. 5 shows the driving circuit of the recording unit among each block shown in FIG. 4.

In the embodiment shown in FIGS. 1–8, one dot information, for example CHI among the code outputs 36 drives HI among the head driving signals 45 by way of the gate 44 as shown in FIG. 5, and in FIG. 6, one heater is supplied with electricity and heated when HI is synchronized with one of the time division signals DD1–DDn, and the ink drops are discharged from one nozzle for one time or for plural number of times. In the embodiment shown in the following FIGS. 9–14, driving is made so that a plural number of liquid drops are discharged from a plural number of nozzles caused by a single dot information output signal. By this means the quality of the print is further improved and the density of the print can be selected by a simple control.

Figure 9:
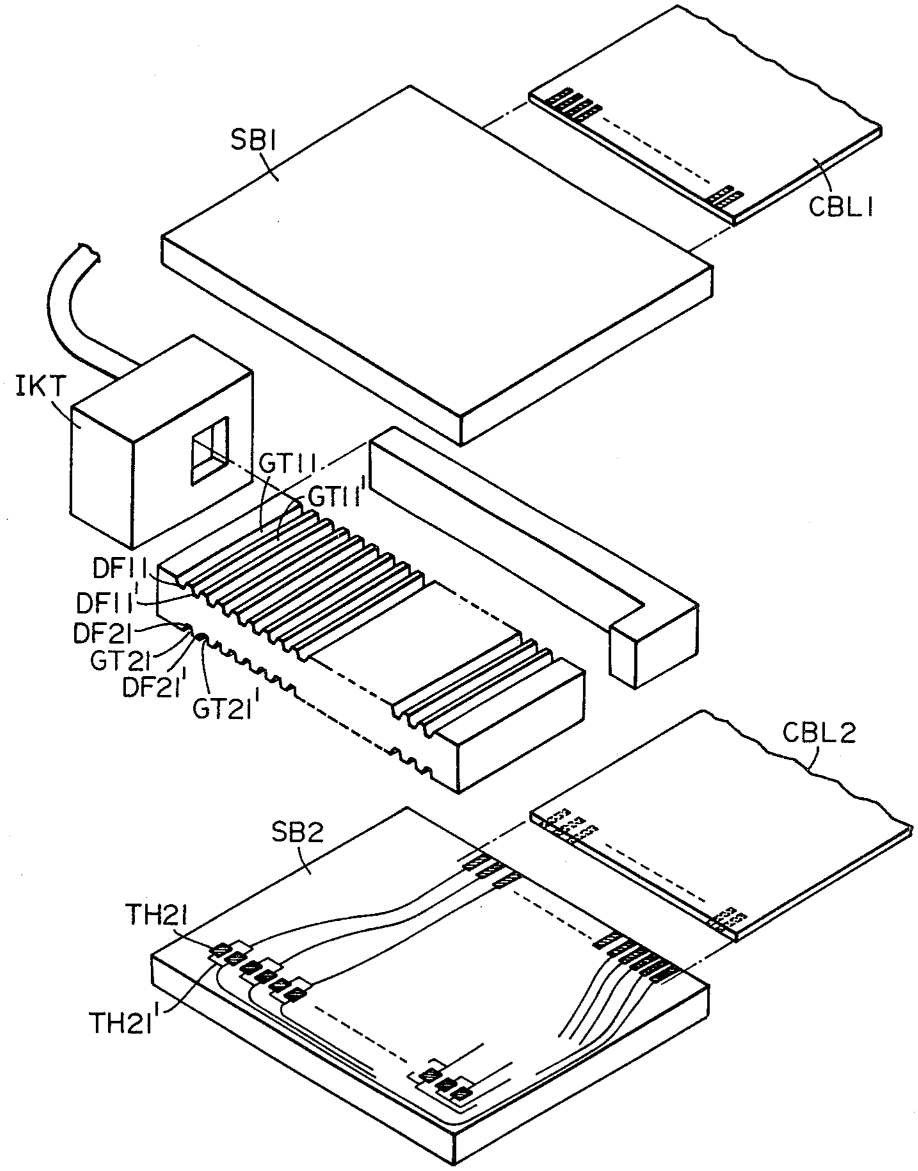
FIG. 9 is the slant view of another embodiment.

FIG. 9 is a slant view describing the recording head unit which is almost similar to the one shown in FIG. 2 above.

In FIG. 9, grooves are formed on upper and lower stages GT11, GT11′, GT21, GT21′ to have a plural number of orifices OF11, OF11′ OF21, OF21′ in vertical direction and corresponding to each two sheets of heater base board SB1 and SB2 are constructed at upper and lower sections. In the horizontal direction two each of heaters, for example TH21 and TH21′, are connected parallelwise on the baseboard.

Figure 10A:
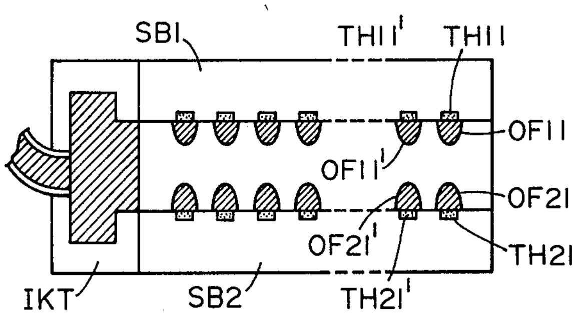
FIGS. 10(A) and (B) are the cross section thereof.
Figure 10B:
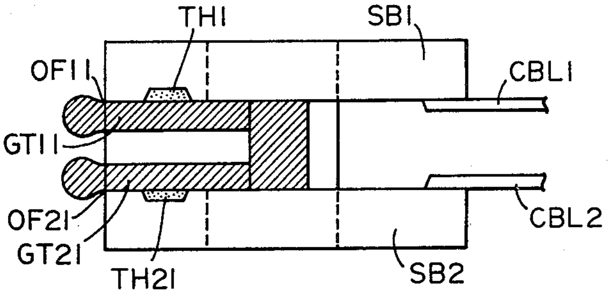

FIG. 10 shows the cross section of the head unit shown in FIG. 9. FIG. 10(A) shows the cross section viewed from the orifice side and FIG. 10(B) shows the cross section at one groove viewed from the lateral direction. If here, for example, two grooves adjacent in horizontal direction to each other and two grooves corresponding in vertical direction are totaled, and the four grooves GT11, GT11′, GT21, GT21′ are controlled simultaneously or time divisionally by the driving signal from one dot information, four liquid drops are discharged either simultaneously or time-divisionally.

In other words, in the two sheets of heater base boards SB1 and SB2 shown in FIG. 9 two adjacent heaters TH11 and TH11′, and TH21 and TH21′ are respectively connected electrically parallelwise, led to the driving circuit by the signalling cables CB1 and CB2 and, if further, heaters corresponding vertically are connected parallelwise, a total of four heaters are connected in parallel.

In such connection, if one dot information and one-time division signal are supplied, the four heaters are heated simultaneously and four liquid drops are discharged simultaneously.

This example of electrical connection is shown in FIG. 11.

Figure 11A:
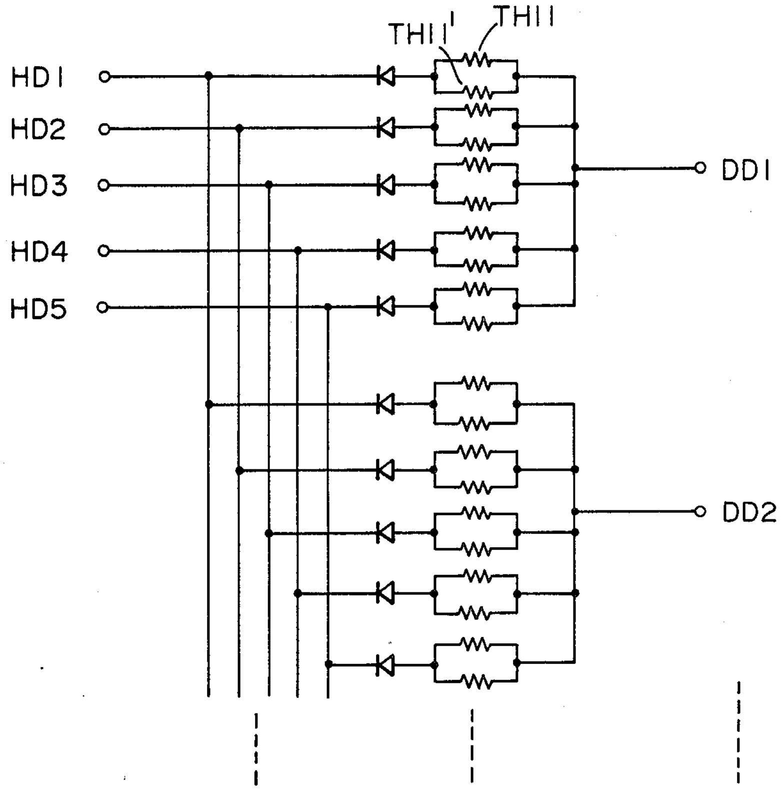
FIGS. 11(A) and (B) show an example of the driving circuit thereof.

FIG. 11(A) shows two heaters TH11 and TH11′ connected in parallel as described above. This corresponds to one of the two sheets of heater base board shown in FIG. 9.

Figure 11B:
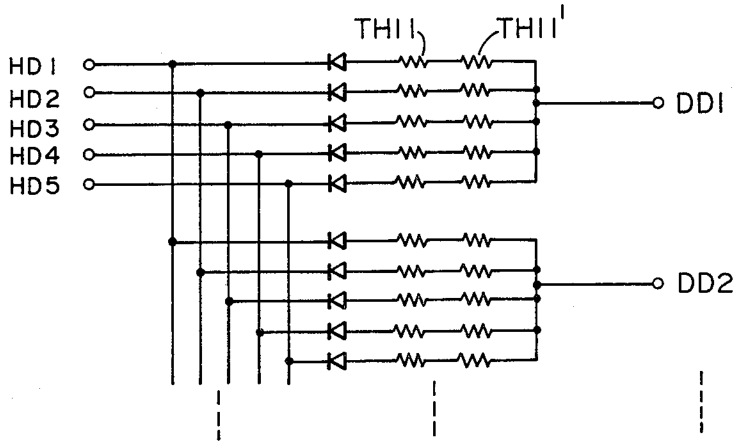

In other words, although the drawing is omitted, if one more set of the same circuit connection formation as shown FIG. 11(A) is provided and, if for each signal HD1–HD5 and DD1–DDn, signals on these two sheets which correspond to them are connected, each becomes parallel. Similarly it is possible to make 2 sheets of heater base boards parallel by connecting two heaters TH11 and TH11' in series as shown in FIG. 11(B).

Including other parallel-serial combinations, four heaters can be driven simultaneously in each case. It is also possible to drive time-divisionally the upper side heater base board SD1 and lower side heater base board SB2 by sharing the time. Of course, it is also effective to combine and drive a plural number of heaters such as two, three, five, seven, six, eight etc., not limiting to four heaters.

Figure 12A:
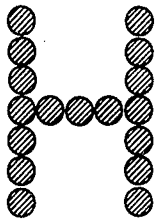
FIGS. 12(A), (B), and (C) show the comparison of prints.
Figure 12B:
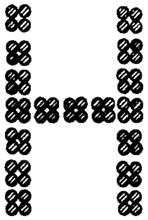
Figure 12C:
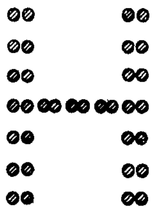

Now, the difference in dot representation on the printing paper will be compared in FIG. 12 for the case, for example, two vertical and two horizontal heaters are driven simultaneously and four liquid drops are discharged simultaneously.

FIG. 12(A) shows the example of print given by the embodiment shown in FIGS. 1–8 mentioned above, where one liquid drop is discharged and represented on the printing paper as a dot by one dot information.

On the contrary, in the present embodiment, since four dots are recorded by one dot information as shown in FIG. 12(B), each corner of the character is represented sharply and the print quality is improved. Moreover, if formation is so made that the upper and lower heater base board described above are controlled separately on the driving circuit side and if selection is made to drive only, for example, the upper side heater base board, since upper two dots are recorded by a single dot information as shown in FIG. 12(A), the total density becomes one half of FIG. 12(B) and the half tone is represented.

Figure 13:
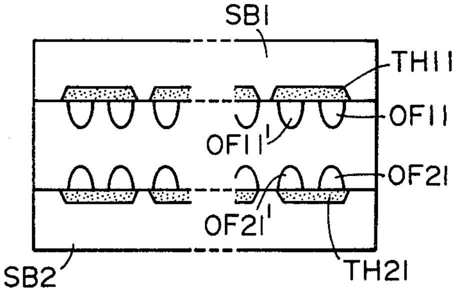
FIGS. 13 and 14 are the drawings for other embodiments.

In FIGS. 9, 10, and 11, an embodiment was described in which one heater is made to correspond to one groove and these combinations are connected either in series or in parallel. FIG. 13 shows an embodiment which is provided with a heater having a width sufficient to correspond to two adjacent grooves and to heat the ink in these two grooves simultaneously.

According to this embodiment, there is no need of connecting heaters either in serial or in parallel in horizontal direction and by connecting in serial-parallel the two corresponding heaters in upper direction or by separately driving time divisionally, a total of four liquid drops are discharged.

In FIG. 9 and in FIGS. 10(A) and (B) an example in which two stages of grooves in vertical direction are formed in parallel was explained.

Figure 14:
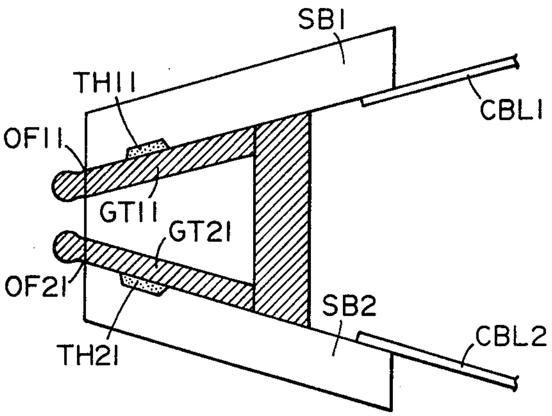

FIG. 14 shows the cross sectional view of an embodiment in which the directions of upper and lower grooves converge on the orifice side. This enables the two dots recorded on the printing paper to approach in vertical direction compared with FIG. 12(B) or to be partially overlapped. Similarly, by using the construction in which the grooves have the shape of being concentrated in two, the dot recording on horizontal direction can be made closer or overlapped.

As have been described so far, according to the embodiment, by forming grooves and heaters minutely in plural numbers and by connecting each heater simply in serial-parallel, a plural number of dot recordings are made by single dot information and print quality is improved without adding any control logical circuit. Further, half tone is represented by selectively driving some of the plural number of heaters.

What I claim is:

1. An electronic device having a thermal ink jet printer comprising:
   - a character generator for generating character information to be recorded on a recording medium;
   - an AND gate, one input terminal of which receives the output of said character generator;
   - heater means for receiving the output of said AND gate and for causing an ink jet nozzle to eject droplets of a recording fluid in response to said AND gate's output;
   - a keyboard provided with an instruction key for instructing the number of outputs of said AND gate; and
   - a control section connected to another input terminal of said AND gate for controlling the number of outputs from said AND gate in accordance with the operation of said instruction key.

2. An electronic device according to claim 1 wherein said device includes an electronic desk-top calculator.

3. An electronic device according to claim 1 wherein said control section comprises a flip-flop responsive to the operation of said instruction key, an AND gate to which a timing signal and the output signal of said flip-flop are applied, and an OR gate to which the output signal of said AND gate is applied.

4. An electronic device according to claim 1 wherein said heater means causes said nozzle to eject the droplets by expansion and contraction of a bubble generated by heat from said heater means.

* * * * *

UNITED STATES PATENT OFFICE

CERTIFICATE OF CORRECTION

Patent No. 4,353,079 Dated October 5, 1982

Inventor(s) Tsuyoshi Kawanabe

It is certified that error appears in the above-identified patent and that said Letters Patent are hereby corrected as shown below:

Column 3, line 49, change "electrically" to --electricity--.

Signed and Sealed this

*Thirty-first* Day of *May 1983*

[SEAL]

*Attest:*

DONALD J. QUIGG

*Attesting Officer* *Acting Commissioner of Patents and Trademarks*